(12) United States Patent
O'Leary et al.

(10) Patent No.: US 11,561,153 B2
(45) Date of Patent: Jan. 24, 2023

(54) DYNAMIC INSTRUMENTATION ASSEMBLY TO MEASURE PROPERTIES OF AN ENGINE EXHAUST STREAM

(71) Applicant: Rolls-Royce North American Technologies Inc., Indianapolis, IN (US)

(72) Inventors: Mark O'Leary, Zionsville, IN (US); Nathan Ottow, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 17/469,836

(22) Filed: Sep. 8, 2021

(65) Prior Publication Data

US 2022/0412842 A1 Dec. 29, 2022

Related U.S. Application Data

(63) Continuation of application No. 17/362,311, filed on Jun. 29, 2021.

(51) Int. Cl.
*G01M 15/14* (2006.01)
*F01D 17/24* (2006.01)
*F01D 17/02* (2006.01)

(52) U.S. Cl.
CPC ............ *G01M 15/14* (2013.01); *F01D 17/02* (2013.01); *F01D 17/24* (2013.01)

(58) Field of Classification Search
CPC ....... G01M 15/02; G01M 15/14; F01D 17/02; F01D 25/285; F05D 2260/83
See application file for complete search history.

(56) References Cited

U.S. PATENT DOCUMENTS

| | | | |
|---|---|---|---|
| 4,584,531 A * | 4/1986 | Couch | G01N 27/626 324/464 |
| 5,106,203 A * | 4/1992 | Napoli | F01D 17/085 374/E13.006 |
| 6,595,062 B1 | 7/2003 | Luke et al. | |
| 9,116,055 B2 * | 8/2015 | Johnston | G01K 11/3206 |
| 9,207,128 B2 * | 12/2015 | McCarthy | G01K 11/3206 |
| 10,684,183 B2 * | 6/2020 | Burgan | G01M 15/02 |
| 10,982,561 B2 * | 4/2021 | Vo | F01D 25/24 |
| 2002/0122459 A1 | 9/2002 | McFarland et al. | |
| 2003/0020480 A1 | 1/2003 | Maylotte et al. | |
| 2004/0114665 A1 | 6/2004 | Park et al. | |
| 2010/0158074 A1 | 6/2010 | Fortier et al. | |

(Continued)

FOREIGN PATENT DOCUMENTS

KR 20100004831 5/2010

*Primary Examiner* — Eric S. McCall
(74) *Attorney, Agent, or Firm* — Barnes & Thornburg LLP

(57) ABSTRACT

An instrumentation assembly configured to measure properties of an engine exhaust stream is disclosed in this paper. The instrumentation assembly may include an outer support ring that extends around a central axis, an inner support ring arranged radially inward of the outer support ring around the central axis, and a plurality of instrumentation rake assemblies. The plurality of instrumentation rake assemblies extends from the outer support ring to the inner support ring across an annular passageway defined between the outer support ring and the inner support ring configured to carry the engine exhaust stream.

20 Claims, 5 Drawing Sheets

(56) References Cited

U.S. PATENT DOCUMENTS

| | | |
|---|---|---|
| 2012/0285237 A1 | 11/2012 | Snider et al. |
| 2013/0323023 A1* | 12/2013 | McCarthy .............. G01K 13/02 |
| | | 374/161 |
| 2019/0186283 A1 | 6/2019 | Boyd |
| 2019/0323909 A1 | 10/2019 | Burgan |
| 2019/0331002 A1* | 10/2019 | Eastwood ............. F01D 25/246 |
| 2020/0041353 A1* | 2/2020 | Jackson ................ G01K 13/02 |
| 2020/0103313 A1 | 4/2020 | Kyritsis |
| 2022/0260001 A1* | 8/2022 | Lefebvre ................... F02K 1/78 |

* cited by examiner

DYNAMIC INSTRUMENTATION ASSEMBLY TO MEASURE PROPERTIES OF AN ENGINE EXHAUST STREAM

CROSS REFERENCE TO RELATED APPLICATIONS

This application claims priority to and the benefit of U.S. patent application Ser. No. 17/362,311, filed 29 Jun. 2021, the disclosure of which is now expressly incorporated herein by reference.

FIELD OF THE DISCLOSURE

The present disclosure relates generally to gas turbine engines and more specifically to instrumentation systems for measuring the performance of exhaust systems in gas turbine engines.

BACKGROUND

Gas turbine engine exhaust systems direct hot and high velocity air away from the engine. The exhaust section of the engine uses several devices in order to accomplish this. A combination of exhaust pipes, a tail cone, and struts help to direct the flow and increase or decrease the velocity of that flow as desired.

A tail cone on the back of the turbine helps to form a duct in the exhaust system between the tail cone and the exhaust pipe surrounding it. This allows the exhaust to be formed into a converging, diverging, or converging/diverging nozzle. These nozzles can increase the velocity of the exhaust gasses to produce additional thrust or decrease the velocity in order to reduce noise. Struts are used in the gas path in order to support the nozzle and to help straighten the flow through the exhaust.

If the gas turbine engine is a turbofan engine, there may be a mixer to mix the hot core gasses with the cooler bypass air in order to reduce the velocity and temperature of the air. This helps to reduce the noise and heat signature of the engine.

It is often difficult to accurately model the exhaust gasses using computer models and computation fluid dynamics and so it is frequently desired to measure temperatures, pressures and other parameters in the hot, high energy exhaust of these devices. These sensors need to be mounted in a way that allows them to be positioned at various locations throughout the exhaust flow.

Sensors positioned in the exhaust flow allow the test operator and engine designers to evaluate the performance of the devices used in the exhaust system in order to change velocity, temperature, and other parameters. These measurements can be used to improve the design of these components directly or can be input into the computer models used to evaluate and improve these designs.

SUMMARY

The present disclosure may comprise one or more of the following features and combinations thereof.

A propulsion system test stand configured to measure properties of an engine exhaust stream may include a gas turbine engine configured to discharge exhaust gas in an aft direction along a central axis of engine rotation, an exhaust duct arranged radially outward of the central axis of engine rotation, and a dynamic instrumentation assembly. The gas turbine engine and the exhaust duct may be configured to conduct the exhaust gas as it moves in an aft direction along a central axis of engine rotation. The dynamic instrumentation assembly may include an outer support ring coupled to the exhaust duct, an inner support ring positioned radially inward of the outer support ring and free to move independent of the gas turbine engine, and a plurality of instrumentation rake assemblies that extend from the outer support ring to the inner support ring. This may allow for a field measurement across locations from the outer support ring to the inner support ring. Each of the plurality of instrumentation rake assemblies may include a sensor arm, at least one sensor coupled to the sensor arm, and mount means for coupling the sensor arm to both the outer support ring and the inner support ring. The sensors may be configured to detect properties of the exhaust gas. The sensor arm mount means may allow selective rotation of the sensor arm about an arm axis extending in the radial direction relative to the central axis of engine rotation. This mount means may enable the sensors to interact with the exhaust air at a desired angle to adjust for swirl imparted into the engine exhaust stream dependent upon configuration of the gas turbine engine and exhaust.

In some embodiments, the mount means may include a retainer which may maintain the sensor arm at a user selected angle.

In some embodiments, the retainer may be a rake angle lock plate coupled to the sensor arm that extends radially outward from the sensor arm along a surface of the outer support ring. The retainer may provide means to prevent relative movement between the rake angle lock plate and the outer support ring in order to allow for setting the desired angle of engagement between the sensors and the exhaust air flow.

In some embodiments, the means to prevent relative movement between the rake angle lock plate and the outer support ring may include at least one arcuate slot formed in the rake angle lock plate along an arc set at a fixed distance from the rotational axis of the sensor arm, one or more threaded inserts set into the surface of the outer support ring along the same arc which may be set at a fixed distance from the rotational axis of the sensor arm used to form the arcuate slot in the rake angle lock plate, and one or more threaded fasteners screwed into the threaded inserts which may allow for pressing the rake angle lock plate onto the outer support ring.

In some embodiments, the mount means may include a sensor arm actuator coupled to the sensor arm and a controller. The controller may be configured to control the sensor arm actuator and may control rotation of the sensor arm and fixation of the sensor arm at a desired angle.

In some embodiments, the controller may direct the sensor arm actuator to rotate the sensor arm through an arc in response to measurements taken by the sensors until the sensors measure the highest pressure along the arc. This may enable the sensors to encounter the exhaust gas at a desired angle.

In some embodiments, the controller may direct the sensor arm actuator to rotate the sensor arm in response to measurements taken by the sensors until the angle of the sensor arm matches a desired angle stored in a memory. This may enable the sensors to encounter the exhaust at a desired angle.

In some embodiments, a plurality of exit guide vanes in the gas turbine engine may rotate along an axis extending in the radial direction relative to the central axis of engine rotation in order to control the direction of exhaust air flow. There may be exit guide vane actuators coupled to the exit guide vanes, which may allow for rotation of the exit guide vanes, and the controller may control the exit guide vane actuators.

In some embodiments, the controller may direct the exit guide vane actuator to rotate in response to the angle of the sensor arm until the sensors encounter the exhaust flow at a desired angle. This may control the swirl imparted into the engine exhaust stream by the gas turbine engine and exhaust duct.

In some embodiments, the controller may direct the exit guide vane actuator to rotate in response to the angle of the sensor arm until the angle of the exit guide vane matches an angle stored in a memory. This may control the swirl imparted into the engine exhaust stream by the gas turbine engine and exhaust duct.

In some embodiments, the retainer may include a rotation disk coupled to the sensor arm which may sit within a bore in the outer support ring. The bore may provide a sealing surface between the sensor arm positioner and the outer support ring in order to prevent gases from moving through the outer support ring.

In some embodiments, the exhaust duct may part of an exhaust system, and the exhaust system may include a test article mounted in the exhaust stream. The test article may affect the flow of the exhaust gas. The dynamic instrumentation assembly may be located aft of the test article along the central axis of engine rotation.

In some embodiments, an engine-mounted instrumentation assembly may be located forward of the test article along the central axis of engine rotation. The engine-mounted instrumentation assembly may be configured to measure properties of an engine exhaust stream. The engine-mounted instrumentation assembly may include an outer support ring of the engine-mounted instrumentation assembly coupled to the exhaust duct, an inner support ring of the engine-mounted instrumentation assembly positioned radially inward of the outer support ring of the engine-mounted instrumentation assembly and coupled to the gas turbine engine, and a plurality of instrumentation rake assemblies of the engine-mounted instrumentation assembly that extend from the outer support ring of the engine-mounted instrumentation assembly to the inner support ring of the engine-mounted instrumentation assembly so as to be coupled at both the outer support ring of the engine-mounted instrumentation assembly and the inner support ring of the engine-mounted instrumentation assembly. The engine-mounted instrumentation assembly may allow for a field measurement across locations from the outer support ring of the engine-mounted instrumentation assembly to the inner support ring of the engine-mounted instrumentation assembly. Each of the plurality of instrumentation rake assemblies of the engine-mounted instrumentation assembly may include a sensor arm of the engine-mounted instrumentation assembly, at least one sensor of the engine-mounted instrumentation assembly coupled to the sensor arm of the engine-mounted instrumentation assembly, and mount means for coupling the sensor arm of the engine-mounted instrumentation assembly to both the outer support ring of the engine-mounted instrumentation assembly and the inner support ring of the engine-mounted instrumentation assembly. The sensors of the engine-mounted instrumentation assembly may detect properties of the exhaust gas. The engine-mounted instrumentation assembly may accommodate movement of the inner support ring of the engine-mounted instrumentation assembly in the aft direction along the central axis of engine rotation relative to the outer support ring of the engine-mounted instrumentation assembly. The movement of the inner support ring of the engine-mounted instrumentation assembly may be caused by thermal expansion of the gas turbine engine along the central axis of engine rotation greater than that of the exhaust duct during operation of the propulsion system test stand.

An instrumentation assembly configured to measure properties of an engine exhaust stream may include an outer support ring coupled to an exhaust duct, an inner support ring positioned radially inward of the outer support ring around a central axis, and a plurality of instrumentation rake assemblies that may extend from the outer support ring to the inner support ring so as to be coupled at both the outer support ring and the inner support ring. Each of the plurality of instrumentation rake assemblies may include a sensor arm, at least one sensor coupled to the sensor arm, an outer rotational connection, and an inner rotation connection which may support the sensor arm to selectively rotate about an arm axis extending in the radial direction relative to the central axis of engine rotation.

In some embodiments, the outer rotational connection may include a retainer which may be configured to maintain the sensor arm at a user selected angle.

In some embodiments, the retainer may be a rake angle lock plate coupled to the sensor arm and a detent. The rake angle lock plate may extend radially outward from the sensor arm along a surface of the outer support ring.

In some embodiments, the retainer may further include at least one arcuate slot which may be formed in the rake angle lock plate along an arc which may be set at a fixed distance from the rotational axis of the sensor arm, one or more threaded inserts which may be set into the surface of the outer support ring along the same arc which may be set at a fixed distance from the rotational axis of the sensor arm used to form the arcuate slot in the rake angle lock plate, and one or more threaded fasteners which may pass through the arcuate slot and into the threaded inserts.

In some embodiments, the outer rotational connection may include an actuator coupled to the sensor arm.

In some embodiments, the inner rotational connection may include a rotation disk in rotational bearing connection with the sensor arm and may be in a bore in the inner support ring.

In some embodiments, the outer rotation connection may include a rotation disk in rotational bearing connection with the sensor arm and may be set in a bore in the outer support ring.

BRIEF DESCRIPTION OF THE DRAWINGS

FIG. 3a is a cutaway view showing the instrumentation rake assembly in its nominal position.

FIG. 3b is a cutaway view showing the instrumentation rake assembly after being rotated about its axis.

DETAILED DESCRIPTION OF THE DRAWINGS

Figure 1:
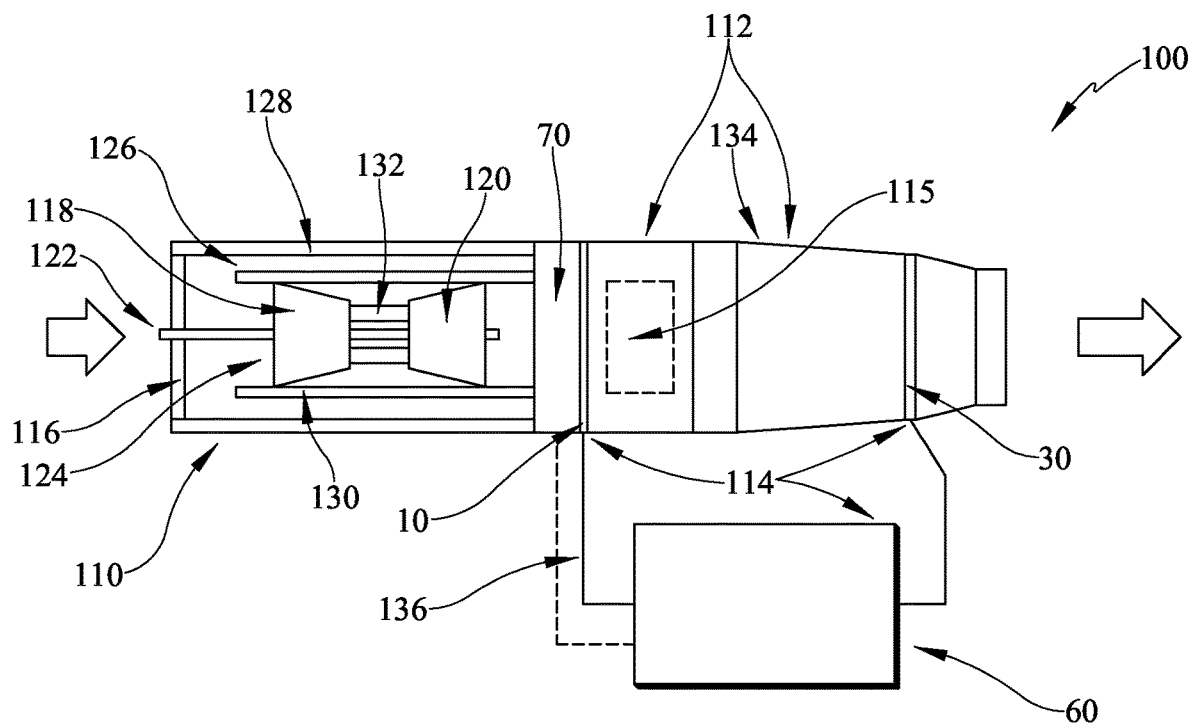
FIG. 1 is a diagrammatic view of a test stand configured to evaluate a test article mounted in the exhaust stream of a gas turbine engine; the test stand including the gas turbine engine, an exhaust system with the test article therein, and an instrumentation system having (i) an engine-mounted instrumentation assembly upstream of the test article, (ii) a dynamic instrumentation assembly downstream of the test article, and (iii) a control/monitoring unit that receives information from the instrumentation assemblies to determine how the test article affects the exhaust stream flow.

For the purposes of promoting an understanding of the principles of the disclosure, reference will now be made to a number of illustrative embodiments illustrated in the drawings and specific language will be used to describe the same.

A propulsion system test stand 100 for evaluating the performance of gas turbine engine system components is shown diagrammatically in FIG. 1. The test stand 100 includes a gas turbine engine 110, an exhaust system 112, and an instrumentation system 114. The gas turbine engine 110 burns fuel to accelerate air and withdraw mechanical power from expanding gas moving through the gas turbine engine 110. The exhaust system 112 conducts expanding gas out of the gas turbine engine 110 and includes a test article 115, whose effect on the exhaust air is being measured by the instrumentation system 114. The instrumentation system 114 is configured to measure the effect of the test article 115 on various properties of the exhaust system 112 such as pressure and temperature.

In this embodiment, the gas turbine engine 110 includes a fan 116, a compressor 118, a turbine 120, and a combustor 132. The fan 116 and compressor 118 are driven by the turbine 120 through shaft 122. Some portion of the air passing through the fan 116 will go through an engine core 124 and some of the air will travel through an outer bypass duct 126. The outer bypass duct 126 is illustratively defined by a fan case 128 and an engine case 130. The combustor 132 burns fuel to add energy to the air passing through the gas turbine engine 110. The exhaust system 112 is coupled to the gas turbine engine 110 and is configured to direct air from the engine core 124 and bypass duct 126 away from the gas turbine engine 110.

The instrumentation system 114 is configured to measure the effect of the test article 115 on various properties of the exhaust air such as pressure and temperature. The instrumentation system 114 includes an engine-mounted instrumentation assembly 10, a dynamic instrumentation assembly 30, and a control/monitoring unit 60. The engine-mounted instrumentation assembly 10 is coupled to both a stationary part of the gas turbine engine 110 and the exhaust duct 134 upstream of the test article 115. The dynamic instrumentation assembly 30 is coupled to the exhaust duct 134 downstream of the test article 115. A control/monitoring unit 60 is connected via a wiring harness 136 to the engine-mounted instrumentation assembly 10 as well as the dynamic instrumentation assembly 30. The control/monitoring unit 60 is configured to received information about the exhaust flow from both instrumentation assemblies 10, 30.

Figure 2:
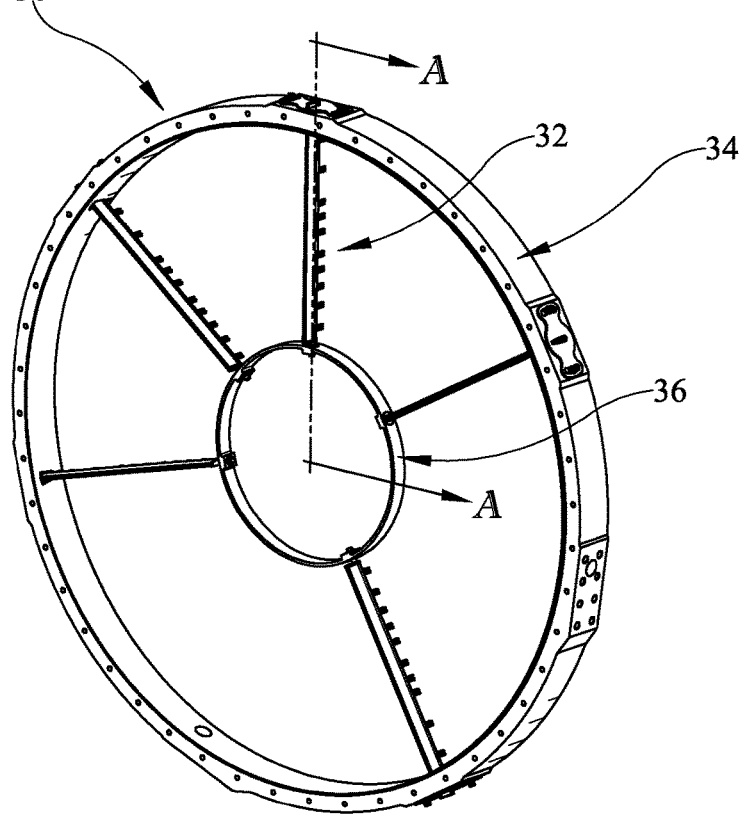
FIG. 2 is a perspective view of the dynamic instrumentation assembly which is adapted to take measurements across the entire radial extent of the engine exhaust and to provide a field array of measurements after the test article, the dynamic instrumentation assembly further adapted to rotate about its axis in order to measure the non-axial components of the exhaust gas flow.

The dynamic instrumentation assembly 30 is configured to measure exhaust gas and is shown in perspective in FIG. 2. The dynamic instrumentation assembly 30 includes a plurality of instrumentation rake assemblies 32 mounted between an outer support ring 34 and an inner support ring 36. The outer support ring 34 is configured to be coupled directly to the exhaust duct 134 and the inner support ring 36 is configured to support the instrumentation rake assemblies 32 without being directly coupled to any other part of the exhaust system 112.

Figures 3A, 3B:
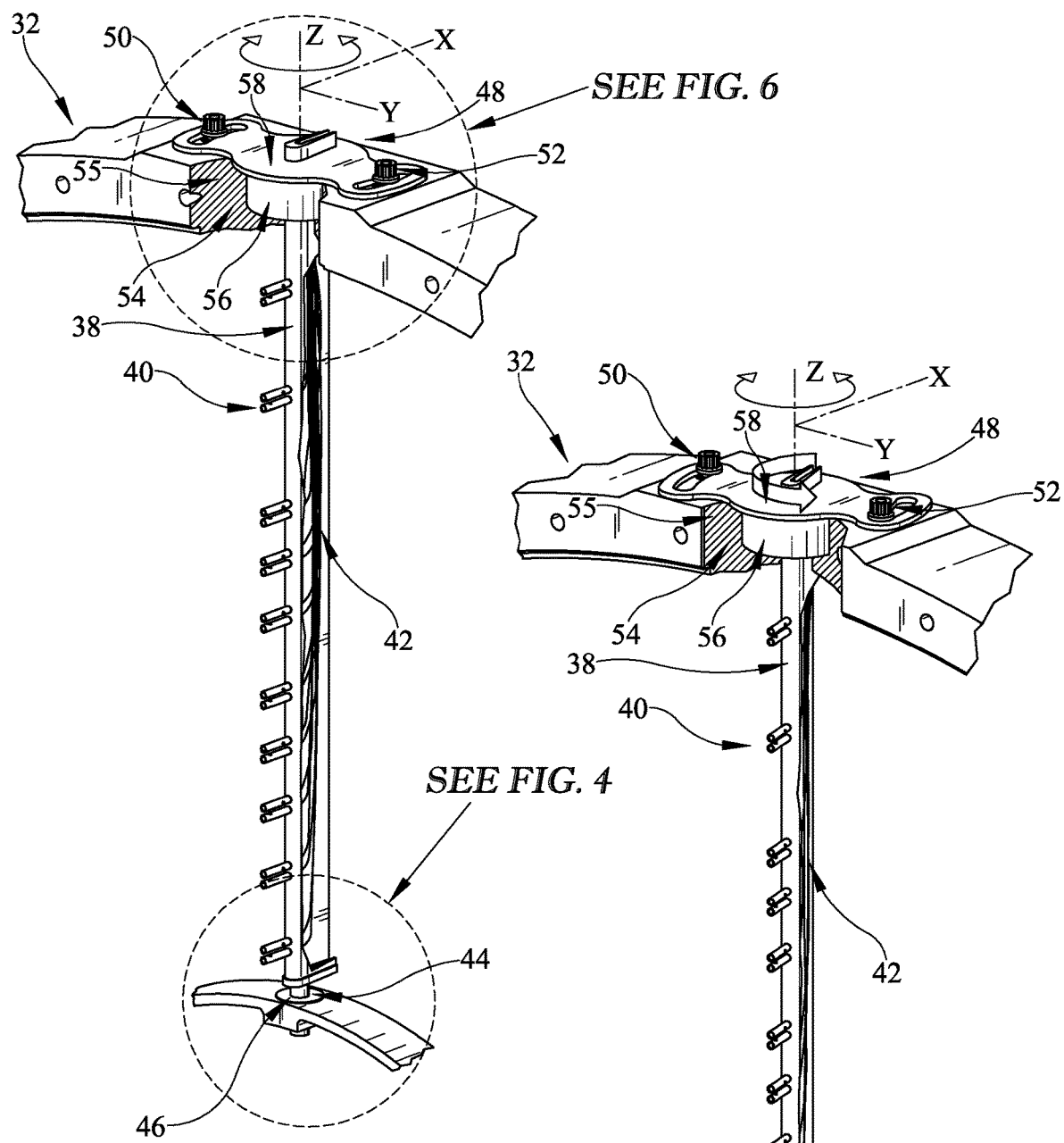
FIG. 3a and FIG. 3b are a pair of cutaway views showing an instrumentation rake assembly mounted to both an outer support ring and an inner support ring, configured to rotate about its axis in order to measure non-axial components of the exhaust gas flow, the instrumentation rake assembly including sensors mounted in a sensor arm, a rotation insert, and a sensor arm positioner configured to selectively hold the sensor arm and sensors in a desired orientation relative to the exhaust gas flow.

The instrumentation rake assembly 32, shown in a cutaway view in FIG. 3a and FIG. 3b, is configured to take measurements of various properties of the air and transmit them back to the control/monitoring unit 60. The instrumentation rake assembly 32 includes a sensor arm 38 supporting a plurality of sensors 40. The signals from the sensors 40 are transmitted via wires 42 out of the instrumentation rake assembly 32 to the control/monitoring unit 60.

The instrumentation rake assembly 32 in FIG. 3a and FIG. 3b is further configured to rotate about an axis Z radial to the exhaust air in order to allow for more accurate measurement of non-linear exhaust air flow. FIG. 3a shows the instrumentation rake assembly 32 in its nominal position, while FIG. 3b shows the instrumentation rake assembly 32 after it has been rotated. The rotation allows the sensor arm 38 to position the sensors 40 at a user selected angle relative to the direction of the exhaust air flow.

Figure 4:
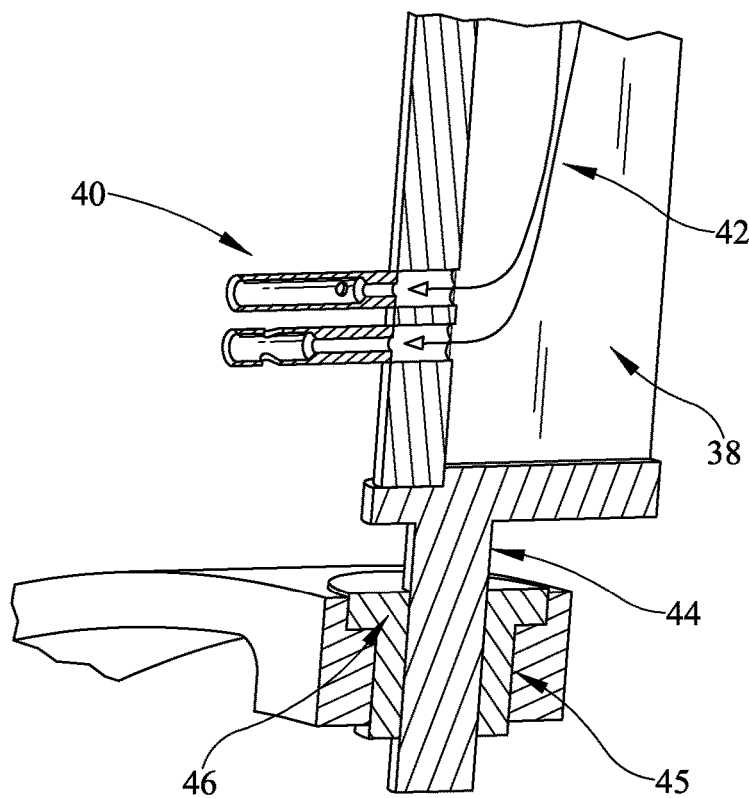
FIG. 4 is a cutaway view showing the instrumentation rake assembly's attachment to the inner support ring, configured to allow the instrumentation assembly to rotate about its axis, including an attachment rod and a rotation insert.

The sensor arm 38 is rotatively coupled to the inner support ring 36 by attachment rod 44, as shown in FIG. 4. In this embodiment, the attachment rod 44 passes through the inner support ring 36. In this embodiment, a rotation insert 46 sitting within an instrumentation ring bore 45 of the inner support ring 36 supports the attachment rod 44 and provides a low friction surface for rotative bearing engagement within the inner support ring 36. In other embodiments, the attachment rod 44 could sit directly within the instrumentation ring bore 45 within the inner support ring 36.

Figure 5:
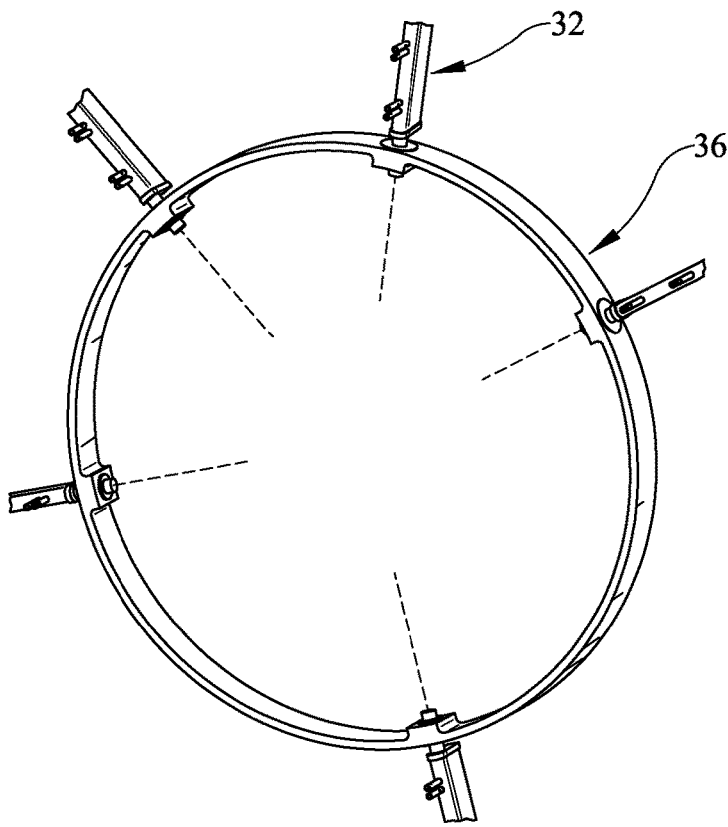
FIG. 5 is a perspective view of the inner support ring, showing the plurality of instrumentation rake assemblies with their axes meeting at the center of the inner support ring.

The inner support ring 36, shown in FIG. 5, is configured to support the instrumentation rake assemblies 32 without being directly coupled to any other part of the exhaust system 112. The axes of the plurality of instrumentation rake assemblies 32 meet at a central point within the inner support ring 36

The sensor arm 38, shown in FIG. 3a and FIG. 3b, is further rotatively coupled to the outer support ring 34 with the sensor arm positioner 48. The sensor arm positioner 48 is configured to selectively hold the sensor arm 38 and sensors 40 in a user selected orientation relative to exhaust air flow.

Figure 6:
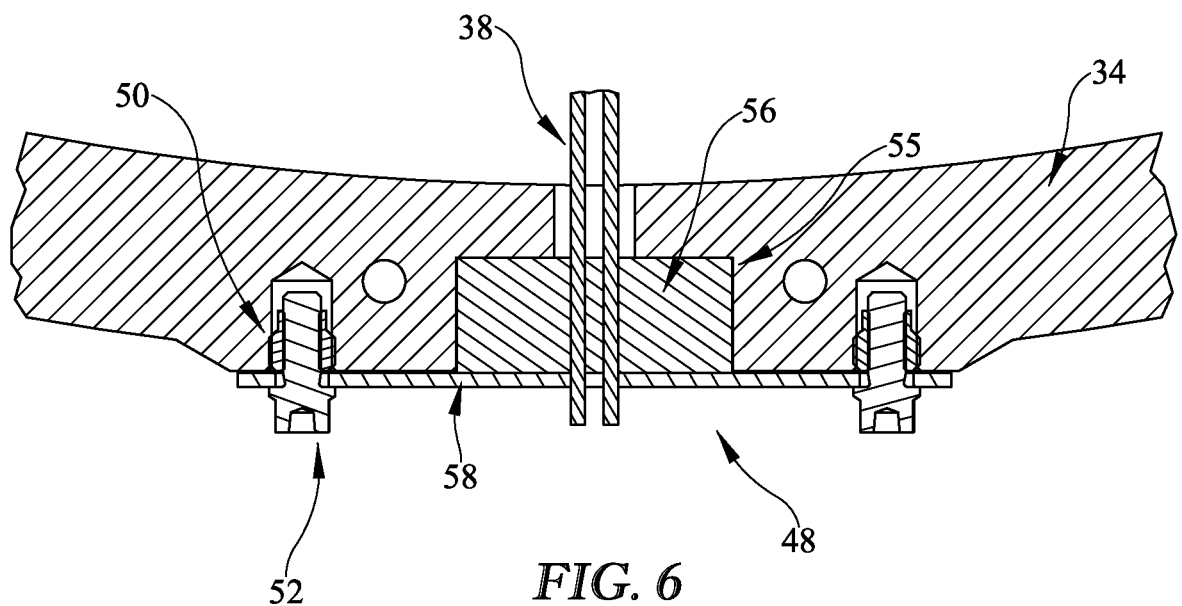
FIG. 6 is a cutaway view showing the instrumentation rake assembly's attachment to the outer support ring with the sensor arm positioner, including a rake angle lock plate, rotation disk, threaded inserts, and fasteners.

The sensor arm positioner 48, shown in FIG. 6, includes threaded inserts 50 which allow the thumb screws 52 to lock the position of the rake angle yolk 54. The rake angle yolk 54 includes a rotation disk 56 which sits within an instrumentation ring bore 55 in the outer support ring 34 and provides a sealing surface against exhaust air. In this configuration, the rotation disk 56 is coupled to a rake angle lock plate 58. The sensor arm 38 passes through both the rotation disk 56 and the rake angle lock plate 58.

Figure 7:
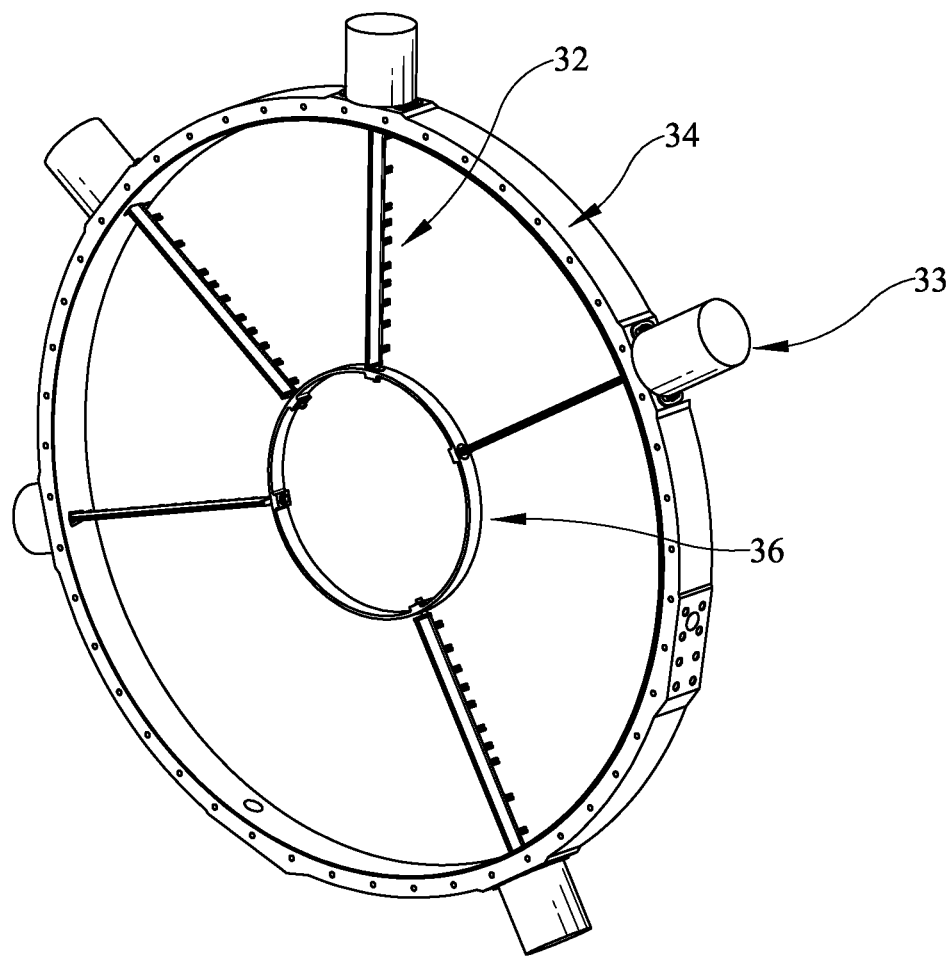
FIG. 7 is a perspective view showing an alternative embodiment of the dynamic instrumentation assembly where the instrumentation rake assembly is coupled to the outer support ring with an actuator, configured to rotate the instrumentation rake assembly about its axis.

In another embodiment, shown in FIG. 7, the sensor arm 38 is rotatively coupled to the outer support ring 34 with a sensor arm actuator 33. The sensor arm actuator 33 is configured to rotate the sensor arm 38 and selectively hold the sensor arm 38 and sensors 40 in an orientation as commanded by the control/monitoring unit 60. In some embodiments the sensor arm actuator 33 could be an electric motor. In other embodiments the sensor arm actuator 33 could be hydraulically powered.

Having the sensor arm positioner 48 positioned on the outer support ring provides the advantage of easier access for adjustment of the sensor arm positioner 48. Similarly, having the sensor arm actuator 33 on the outer support ring provides easier access for wires or hydraulic lines. If access is not an issue, such as when the dynamic instrumentation assembly 30 is at the far aft end of the propulsion system test stand 100, the sensor arm positioner 48 or sensor arm actuator 33 could alternatively be positioned on the inner support ring 36.

Figure 8:
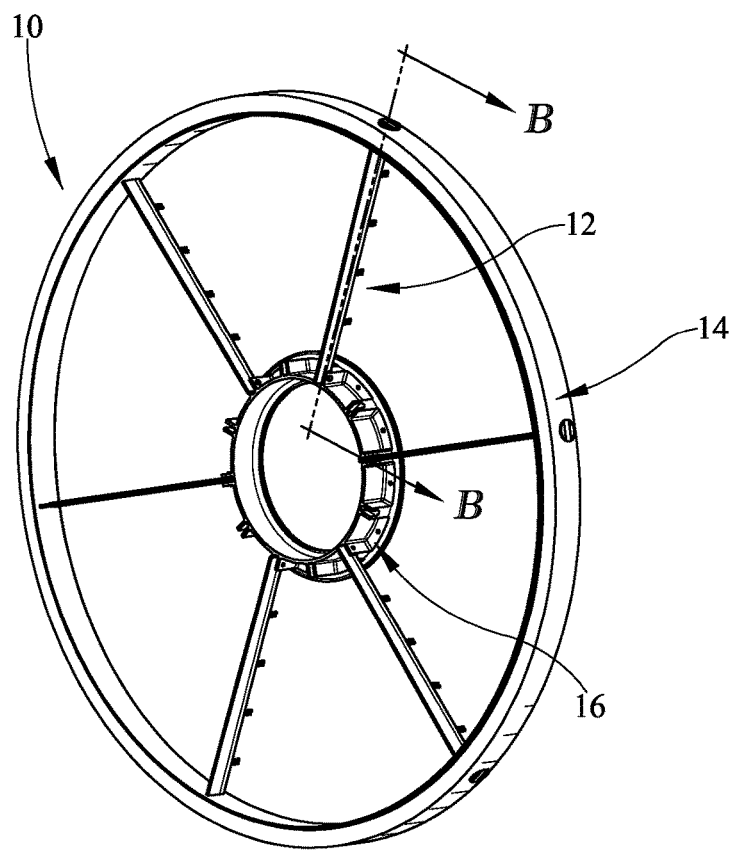
FIG. 8 is a perspective view of the engine-mounted instrumentation assembly which is adapted to take measurements across the entire radial extent of the engine exhaust and to provide a full field array of measurements ahead of test article, the engine-mounted instrumentation assembly is further adapted to accommodate relative movement of components of the gas turbine engine due to uneven expansion and contraction.

The engine-mounted instrumentation assembly 10 is configured to measure exhaust gas and is shown in perspective in FIG. 8. The engine-mounted instrumentation assembly 10 includes a plurality of instrumentation rake assemblies 12 mounted between an outer support ring 14 and an inner support ring 16. The outer support ring 14 is configured to be coupled directly to the exhaust duct 134 and the inner support ring 16 is configured to be coupled directly to a stationary part of the gas turbine engine 110. For example, the inner support ring 16 may be coupled to a tailcone.

Figure 9:
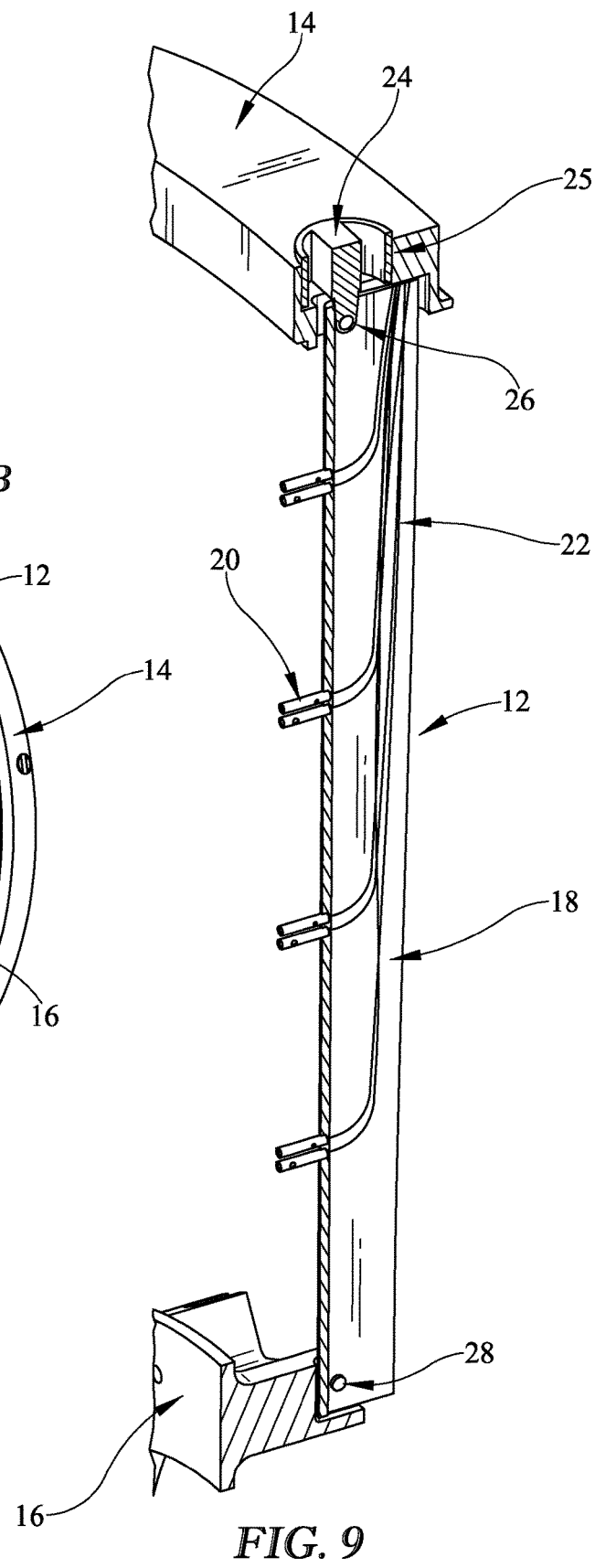
FIG. 9 is a cutaway view showing a portion of the engine-mounted instrumentation assembly; the engine-mounted instrumentation assembly including an outer ring, an inner ring, and instrumentation rake assembly that extends between the outer support ring and the inner support ring configured to accommodate relative movement between the outer and inner rings; the instrumentation rake assembly including sensors housed in a sensor arm and a piston configured to provide a sealing surface against exhaust pressure.

The instrumentation rake assembly 12, shown in a cut-away view in FIG. 9, is configured to take measurements of various properties of the air and transmit them back to the control/monitoring unit 60. The instrumentation rake assembly 12 includes a sensor arm 18 supporting a plurality of sensors 20. The signals from the sensors 20 are transmitted via wires 22 out of the instrumentation rake assembly 12 to the control/monitoring unit 60.

The instrumentation rake assembly 12, shown in its nominal position in FIG. 9, is further configured to accommodate relative movement of the outer support ring 14 and the inner support ring 16 due to differing thermal expansion without damaging the sensor arm 18.

The sensor arm 18 is pivotably coupled at one end to a piston 24, included in the instrumentation rake assembly 12, with an outer pin 26 as shown as FIG. 9. The sensor arm 18 is further pivotably coupled to the inner support ring 16 with an inner pin 28.

The piston 24 moves radially within an instrumentation ring bore 25 inside the outer support ring 14. The sensor arm 18 rotates relative to the piston 24 and outer support ring 14 about the outer pin 26. The sensor arm 18 rotates about the inner pin 28 when displaced by movement of the inner support ring 16.

The combination of the piston 24, outer pin 26, and inner pin 28 allow for the sensor arm 18 to move while still being coupled at both ends, allowing for a full field measurement to be taken across the entire radial extent of the exhaust stream as suggested in FIG. 9. When uneven thermal expansion occurs within the gas turbine engine 110 relative axial and/or radial movement of the inner support ring 16 relative to the outer support ring 14 may be induced. To accommodate this, the sensor arm 18 will rotate about outer pin 26 and inner pin 28, and piston 24 will slide radially within the outer support ring 14.

The control/monitoring unit 60 is configured to receive signals from the engine-mounted instrumentation assembly 10 and the dynamic instrumentation assembly 30 over the wiring harness 136. The signal from the sensors 20, 40 is received by a processor, converted into data, and stored in memory. The data can then be accessed from the control/monitoring unit 60 either remotely or directly by test personnel.

In operation a user mounts the test article 115 to the exhaust of the gas turbine engine 110. This test article could be, but is not limited to, a device for mixing the hot core exhaust air with the cooler fan bypass air. This mixing reduces the velocity of the core exhaust air, which reduces the amount of noise produced. The mixing also reduced the temperature of the core exhaust air. The lower temperature reduces the heat signature of the engine.

In order to measure the impact that the test article 115 has on the exhaust air, it can be helpful for measurements to be taken upstream and downstream of the test article 115. The engine-mounted instrumentation assembly 10 is pivotably coupled to both the engine core 124 and the fan case 128. The higher temperature of the core air in comparison to the fan bypass air will cause the engine core 124 to expand axially more than the fan case 128. The engine-mounted instrumentation assembly 10 accommodates this relative movement and sends measurements of the air to the control/monitoring unit 60.

After the exhaust air passes over the test article 115 the dynamic instrumentation assembly 30 sends measurements of the air to the control/monitoring unit 60. The test article 115 may induce swirl or otherwise cause the exhaust air to encounter the sensors 40 at an oblique angle. The instrumentation rake assembly 32 is configured to rotate about an axis Z radial in order to accommodate this non-linear flow and allow sensors to encounter the air at the desired angle.

The control/monitoring unit 60 stores in memory the measurements taken by the engine-mounted instrumentation assembly 10 and the dynamic instrumentation assembly 30. After accessing this data the user or control/monitoring unit 60 can adjust the angle of the instrumentation rake assembly 32. The full array of sensors on both instrumentation assemblies 10, 30 allow the user to understand the impact of the test article 115 on the exhaust flow.

One method of determining the ideal angle of the sensors 40 is to take a first measurement of exhaust gas pressure at a first angle, adjust the instrumentation rake assembly 32, and take a second measurement at a second angle. The user or control/monitoring unit 60 would compare the two pressures and continue to adjust the angle of the instrumentation rake assembly 32 until they find the angle at which the maximum pressure is measured. This would indicate that the sensors 40 are encountering the exhaust flow at the ideal angle.

Optionally, there may be actuators on exit guide vanes 70 in exhaust of the gas turbine engine 110. These actuators are connected to the control/monitoring unit 60 and control the angle of the exit guide vanes, which impacts the swirl of the exhaust gas passing through the gas turbine engine. The control/monitoring unit 60 can determine the direction of the exhaust flow based on the angle of the sensors 40 on the instrumentation rake assembly 32. If the exhaust flow direction is desired to be different, the control/monitoring unit 60 can adjust the angle of the exit guide vanes 70. Using the measurements taken by the sensors 40 on the instrumentation rake assembly 32 in a feedback loop with the exit guide vanes 70, the control/monitoring unit 60 can achieve the desired direction of the exhaust flow.

In order to improve the performance of gas turbine engines and rocket motors, it is frequently desired to measure temperatures, pressures and other parameters in the hot, high energy exhaust of these devices. Typically, the required probes are mounted on cantilevered rakes. These rakes, only supported on one end, can be prone to vibration and can be necessarily short due to the high bending loads and the low allowable stress of the rake material at high exhaust temperatures. Short rakes limit the measurements that can be taken towards the center of the flowpath. Additionally, fixed cantilevered rakes are unable to rotate about their axis. Instrumentation rakes, like the sensor arms 18 and 38, supported at both ends have lower bending stresses and vibrate less.

Instrumentation rakes supported at both ends can extend probes more deeply into the exhaust flowpath. Additionally, these rakes can be rotated about their axes so as to better understand the non-axial components of exhaust flow, i.e. "swirl". If the angle of "swirl" of the exhaust gas flow is known at the location of the instrumentation rakes, the angle of the rakes can be set to this angle so that maximum static pressures and temperatures of the flowpath at this location are being recorded. Additionally, if the angle of flowpath swirl isn't known and if the rake angle is driven by actuators, the rakes could be rotated during engine operation to find the angle where the static pressure is greatest and hence the angle of "swirl".

As the hot instrumentation rake expands and contracts, the piston 24 rides up and down in the instrumentation ring bore 25. As the hot engine 110 expands axially relative to the cooler instrumentation ring, the instrumentation rake rocks back and forth on the upper and lower rake pins.

Materials for the piston, rake angle lock plate, rotation disk, and instrumentation ring (outer support ring) if the temperatures are cool enough could be, but are not limited to, high strength steels such as 17-4PH or SS AISI 347. If temperatures are too high for those, Ni alloys such as IN718, IN625 or Hast-X could also be used. Materials for the instrumentation rake (sensor arm) could be, but are not limited to, high temperature high strength Ni alloys such as Waspalloy or Mar M247. Materials for the rake base mount (inner support ring) could be, but are not limited to, Ni alloys such as IN718, IN625, or Hast-X. Materials for the rotation insert could be, but are not limited to, a cobalt alloy such as Graphalloy.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A propulsion system test stand configured to measure properties of an engine exhaust stream, the propulsion system test stand comprising
    a gas turbine engine configured to discharge exhaust gas in an aft direction along a central axis of engine rotation,
    an exhaust duct arranged radially outward of the central axis of engine rotation and configured to conduct the exhaust gas as it moves in the aft direction along the central axis of engine rotation, and
    a dynamic instrumentation assembly including an outer support ring coupled to the exhaust duct, an inner support ring positioned radially inward of the outer support ring and free to move independent of the gas turbine engine, and a plurality of instrumentation rake assemblies that extend from the outer support ring to the inner support ring so as to be coupled at both the outer support ring and the inner support ring allowing for a field measurement across locations from the outer support ring to the inner support ring,
    wherein each of the plurality of instrumentation rake assemblies includes a sensor arm, at least one sensor coupled to the sensor arm configured to detect properties of the exhaust gas, and mount means for coupling the sensor arm to both the outer support ring and the inner support ring while allowing selective rotation of the sensor arm about an arm axis extending in the radial direction relative to the central axis of engine rotation so as to enable the sensors to interact with the exhaust air at a desired angle to adjust for swirl imparted into the engine exhaust stream dependent upon configuration of the gas turbine engine and exhaust.

2. The propulsion system test stand of claim 1, wherein the mount means includes a retainer configured to maintain the sensor arm at a user selected angle.

3. The propulsion system test stand of claim 2, wherein the retainer includes a rotation disk coupled to the sensor arm which sits within a bore in the outer support ring, the bore configured to provide a sealing surface between the sensor arm positioner and the outer support ring in order to prevent gases from moving through the outer support ring.

4. The propulsion system test stand of claim 2, wherein the retainer is a rake angle lock plate coupled to the sensor arm that extends radially outward from the sensor arm along a surface of the outer support ring, and means to prevent relative movement between the rake angle lock plate and the outer support ring in order to allow for setting the desired angle of engagement between the sensors and the exhaust air flow.

5. The propulsion system test stand of claim 4, wherein the means to prevent relative movement between the rake angle lock plate and the outer support ring includes
    at least one arcuate slot formed in the rake angle lock plate along an arc set at a fixed distance from the rotational axis of the sensor arm,
    one or more threaded inserts set into the surface of the outer support ring along the same arc set at a fixed distance from the rotational axis of the sensor arm used to form the arcuate slot in the rake angle lock plate, one or more threaded fasteners screwed into the threaded inserts to allow for pressing the rake angle lock plate onto the outer support ring.

6. The propulsion system test stand of claim 1, wherein the mount means includes a sensor arm actuator coupled to the sensor arm that is configured to selectively drive rotation of the sensor arm, and a controller that is configured to control the sensor arm actuator so as to control rotation of the sensor arm and fixation of the sensor arm at a desired angle.

7. The propulsion system test stand of claim 6, wherein the controller directs the sensor arm actuator to rotate the sensor arm through an arc in response to measurements taken by the sensors until the sensors measure the highest pressure along the arc so as to enable the sensors to encounter the exhaust gas at a desired angle.

8. The propulsion system test stand of claim 6, wherein the controller directs the sensor arm actuator to rotate the sensor arm in response to measurements taken by the sensors until the angle of the sensor arm matches a desired angle stored in a memory so as to enable the sensors to encounter the exhaust at a desired angle.

9. The propulsion system test stand of claim 6, further including
a plurality of exit guide vanes in the gas turbine engine configured to rotate along an axis extending in the radial direction relative to the central axis of engine rotation in order to control the direction of exhaust air flow,
exit guide vane actuators coupled to the exit guide vanes, configured to allow for rotation of the exit guide vanes, and the controller being further configured control the exit guide vane actuators.

10. The propulsion system test stand of claim 9, wherein the controller directs the exit guide vane actuators to rotate in response to the angle of the sensor arm until the sensors encounter the exhaust flow at a desired angle in order to control the swirl imparted into the engine exhaust stream by the gas turbine engine and exhaust duct.

11. The propulsion system test stand of claim 9, wherein the controller directs the exit guide vane actuator to rotate in response to the angle of the sensor arm until the angle of the exit guide vane matches an angle stored in a memory in order to control the swirl imparted into the engine exhaust stream by the gas turbine engine and exhaust duct.

12. The propulsion system test stand of claim 1, wherein the exhaust duct is included as part of an exhaust system, the exhaust system further includes a test article mounted in the exhaust stream and configured to affect the flow of the exhaust gas, and the dynamic instrumentation assembly is located aft of the test article along the central axis of engine rotation.

13. The propulsion system test stand of claim 12, further comprising an engine-mounted instrumentation assembly located forward of the test article along the central axis of engine rotation configured to measure properties of an engine exhaust stream, the engine-mounted instrumentation assembly including an outer support ring of the engine-mounted instrumentation assembly coupled to the exhaust duct, an inner support ring of the engine-mounted instrumentation assembly positioned radially inward of the outer support ring of the engine-mounted instrumentation assembly and coupled to the gas turbine engine, and a plurality of instrumentation rake assemblies of the engine-mounted instrumentation assembly that extend from the outer support ring of the engine-mounted instrumentation assembly to the inner support ring of the engine-mounted instrumentation assembly so as to be coupled at both the outer support ring of the engine-mounted instrumentation assembly and the inner support ring of the engine-mounted instrumentation assembly allowing for a field measurement across locations from the outer support ring of the engine-mounted instrumentation assembly to the inner support ring of the engine-mounted instrumentation assembly, wherein each of the plurality of instrumentation rake assemblies of the engine-mounted instrumentation assembly includes a sensor arm of the engine-mounted instrumentation assembly, at least one sensor of the engine-mounted instrumentation assembly coupled to the sensor arm of the engine-mounted instrumentation assembly configured to detect properties of the exhaust gas, and mount means for coupling the sensor arm of the engine-mounted instrumentation assembly to both the outer support ring of the engine-mounted instrumentation assembly and the inner support ring of the engine-mounted instrumentation assembly to accommodate movement of the inner support ring of the engine-mounted instrumentation assembly, in the aft direction along the central axis of engine rotation, relative to the outer support ring of the engine-mounted instrumentation assembly, the movement of the inner support ring of the engine-mounted instrumentation assembly caused by thermal expansion of the gas turbine engine along the central axis of engine rotation greater than that of the exhaust duct during operation of the propulsion system test stand.

14. An instrumentation assembly configured to measure properties of an engine exhaust stream, the instrumentation assembly comprising
an outer support ring coupled to an exhaust duct,
an inner support ring positioned radially inward of the outer support ring around a central axis,
a plurality of instrumentation rake assemblies that extend from the outer support ring to the inner support ring so as to be coupled at both the outer support ring and the inner support ring,
wherein each of the plurality of instrumentation rake assemblies includes a sensor arm, at least one sensor coupled to the sensor arm, an outer rotational connection, and an inner rotation connection which support the sensor arm to selectively rotate about an arm axis extending in the radial direction relative to the central axis of engine rotation.

15. The instrumentation assembly of claim 14, wherein the outer rotational connection includes an actuator coupled to the sensor arm.

16. The instrumentation assembly of claim 14, wherein the inner rotational connection includes a rotation disk in rotational bearing connection with the sensor arm and set in a bore in the inner support ring.

17. The instrumentation assembly of claim 14, wherein the outer rotation connection includes a rotation disk in rotational bearing connection with the sensor arm and set in a bore in the outer support ring.

18. The instrumentation assembly of claim 14, wherein the outer rotational connection includes a retainer configured to maintain the sensor arm at a user selected angle.

19. The instrumentation assembly of claim 18, wherein the retainer is a rake angle lock plate coupled to the sensor arm that extends radially outward from the sensor arm along a surface of the outer support ring and a detent.

20. The instrumentation assembly of claim 19, wherein the retainer further includes
at least one arcuate slot formed in the rake angle lock plate along an arc set at a fixed distance from the rotational axis of the sensor arm, one or more threaded inserts set into the surface of the outer support ring along the same arc set at a fixed distance from the rotational axis of the sensor arm used to form the arcuate slot in the rake angle lock plate,
and one or more threaded fasteners passed through the arcuate slot and into the threaded inserts.

\* \* \* \* \*